United States Patent [19]

Alonso

[11] Patent Number: 5,269,553
[45] Date of Patent: Dec. 14, 1993

[54] TOWING APPARATUS AND THRUST REVERSAL MECHANISM THEREFOR

[76] Inventor: Elmy Alonso, Two NE. 160th St., North Miami Beach, Fla. 33162

[21] Appl. No.: 22,452

[22] Filed: Feb. 25, 1993

[51] Int. Cl.[5] .......................... B60P 3/07; B62D 53/04
[52] U.S. Cl. ............................... 280/402; 280/405.1; 414/563
[58] Field of Search .................. 280/402, 405.1, 406.1, 280/489, 496, 755; 414/563, 428

[56] References Cited

U.S. PATENT DOCUMENTS

| | | | |
|---|---|---|---|
| 2,111,341 | 3/1938 | Tetrault | 414/563 |
| 2,747,890 | 5/1956 | Gerhardt et al. | 280/406.1 |
| 3,105,705 | 10/1963 | Richard | 280/406.1 X |
| 3,687,315 | 8/1972 | Donaldson | 414/563 |
| 4,264,262 | 4/1981 | LoCodo | 414/563 |
| 4,265,463 | 5/1981 | Perruso | 280/402 |
| 4,318,657 | 3/1982 | Znidaric | 414/563 X |
| 4,664,585 | 5/1987 | Ambridge et al. | 414/563 |
| 4,761,110 | 8/1988 | Boutilier | 414/563 |
| 4,874,285 | 10/1989 | Bubik | 414/563 |

Primary Examiner—Margaret A. Focarino
Assistant Examiner—Florian Zeender
Attorney, Agent, or Firm—Robert M. Schwartz; Edward I. Mates

[57] ABSTRACT

Towing apparatus comprising a towing vehicle and a lifting frame that supports one end of a towed vehicle off the ground and is connected to the towing vehicle through a thrust reversal system, comprising one or more thrust reversal mechanisms, each having a rear lever arm fixed at its rear end portion to the lifting frame, a front lever arm fixed to the main frame of the towing apparatus only at a position forward of a rear wheel axle of the towing vehicle and intermeshing gears, fixed to the rear end portion of the front lever arm and the front end portion of the rear lever arm, respectively. A bracket resting on but not directly connected to the main frame of the towing vehicle near its rear wheel axle holds two pivot rods about which the intermeshing gears are rotatably mounted for simultaneous opposite rotation. This relatively simple structure overcomes the tendency of the load of a wrecked vehicle on the lifting frame to lift the front end of the towing vehicle about a pivot axis defined by a pair of rear wheels mounted on the rear wheel axle of the towing vehicle.

13 Claims, 5 Drawing Sheets

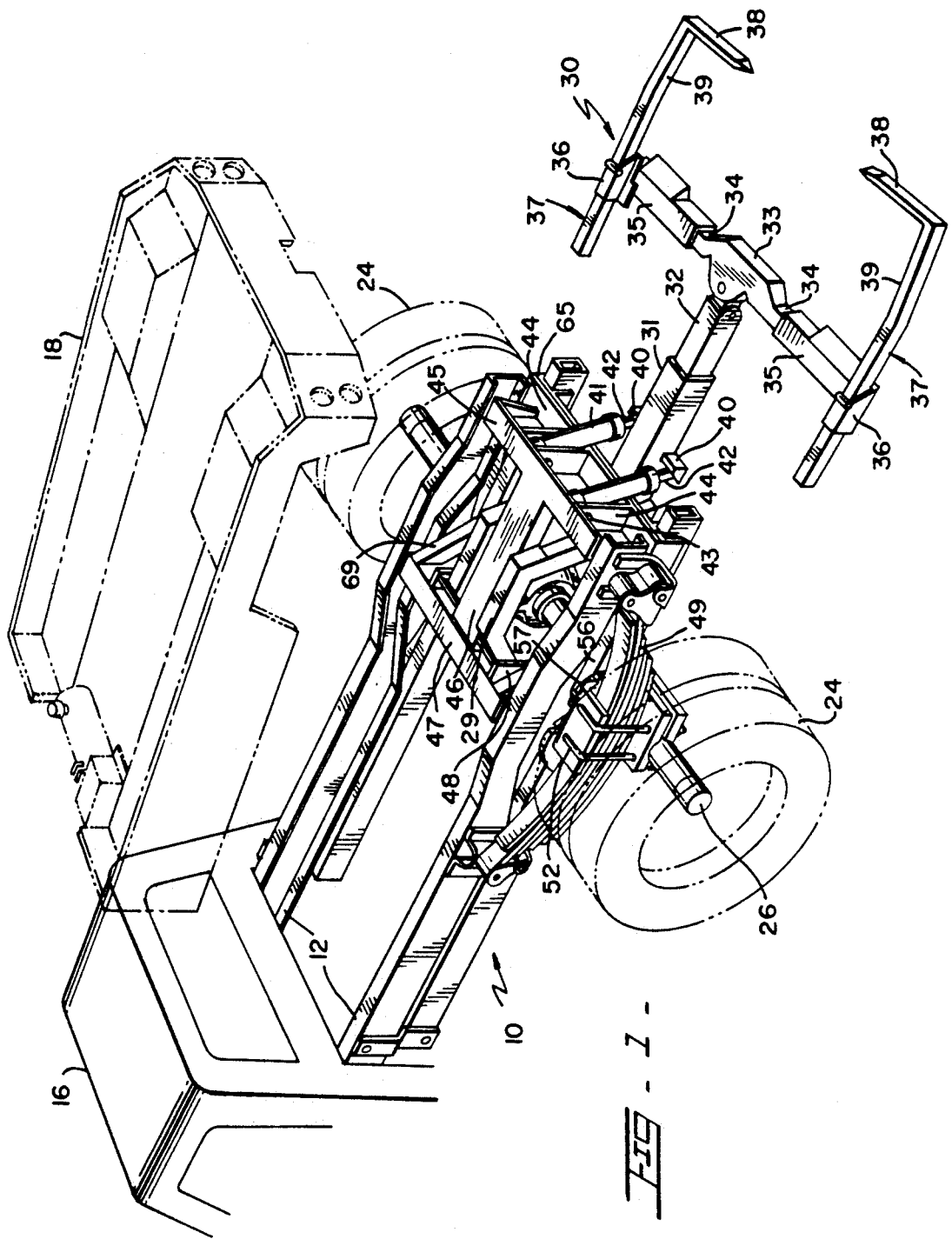

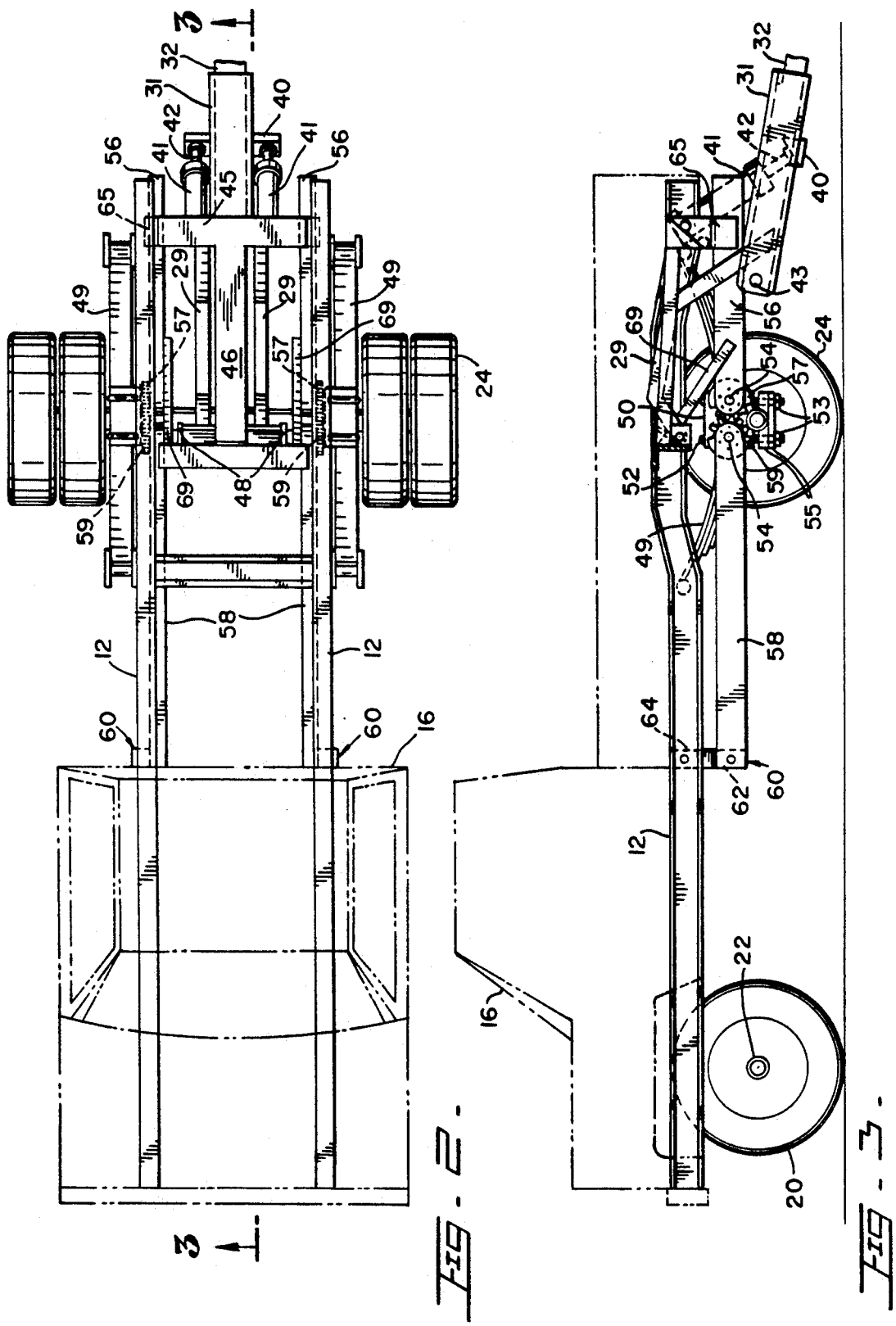

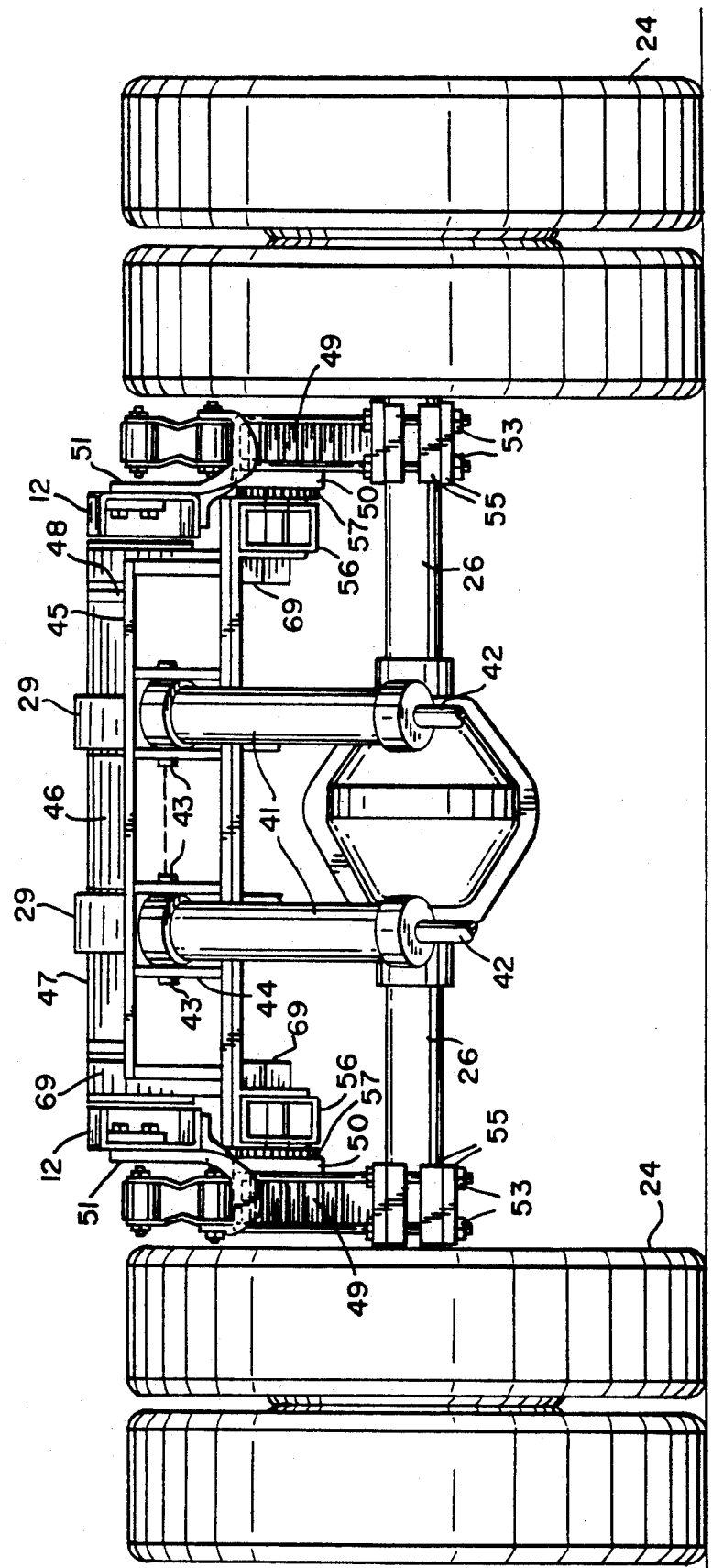

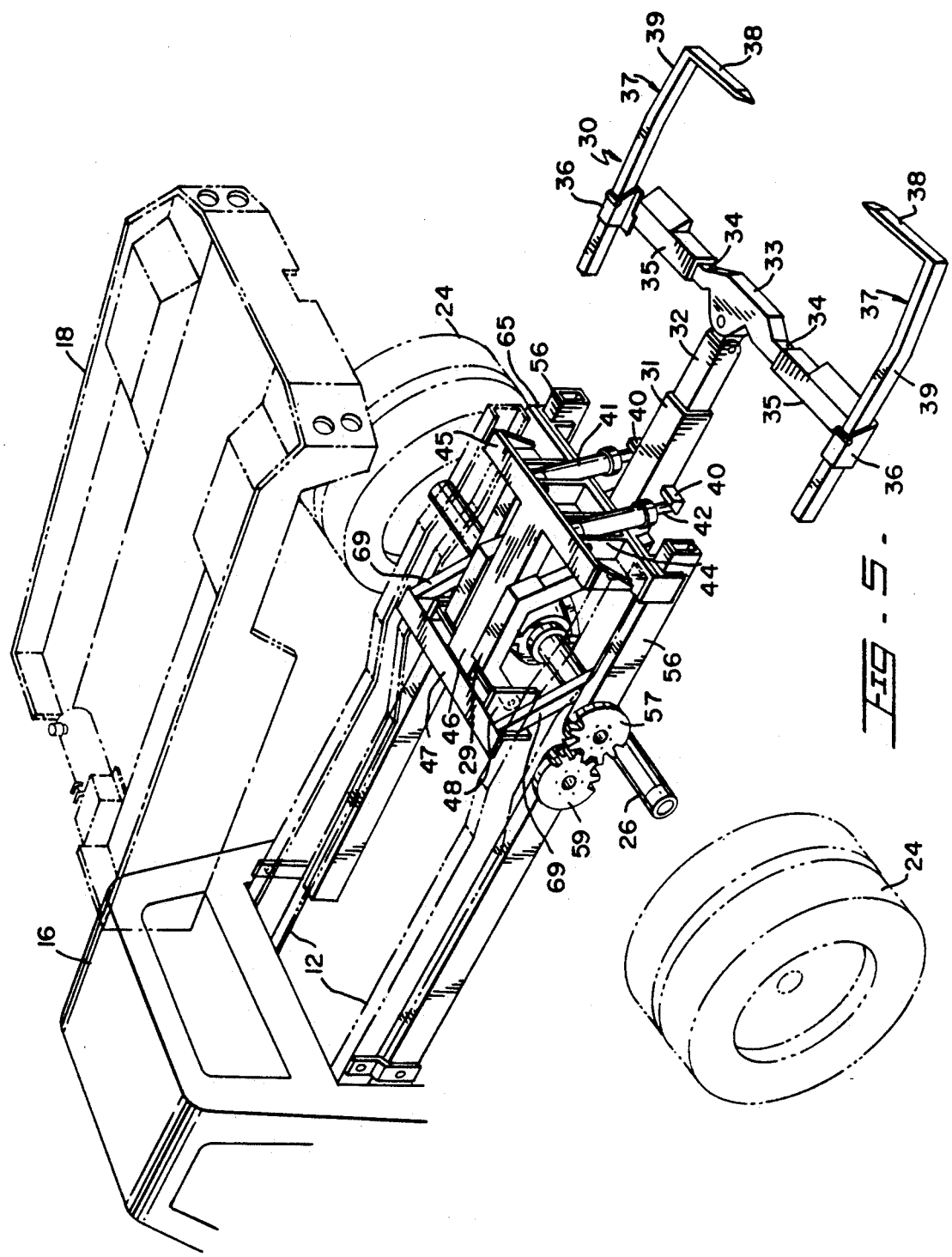

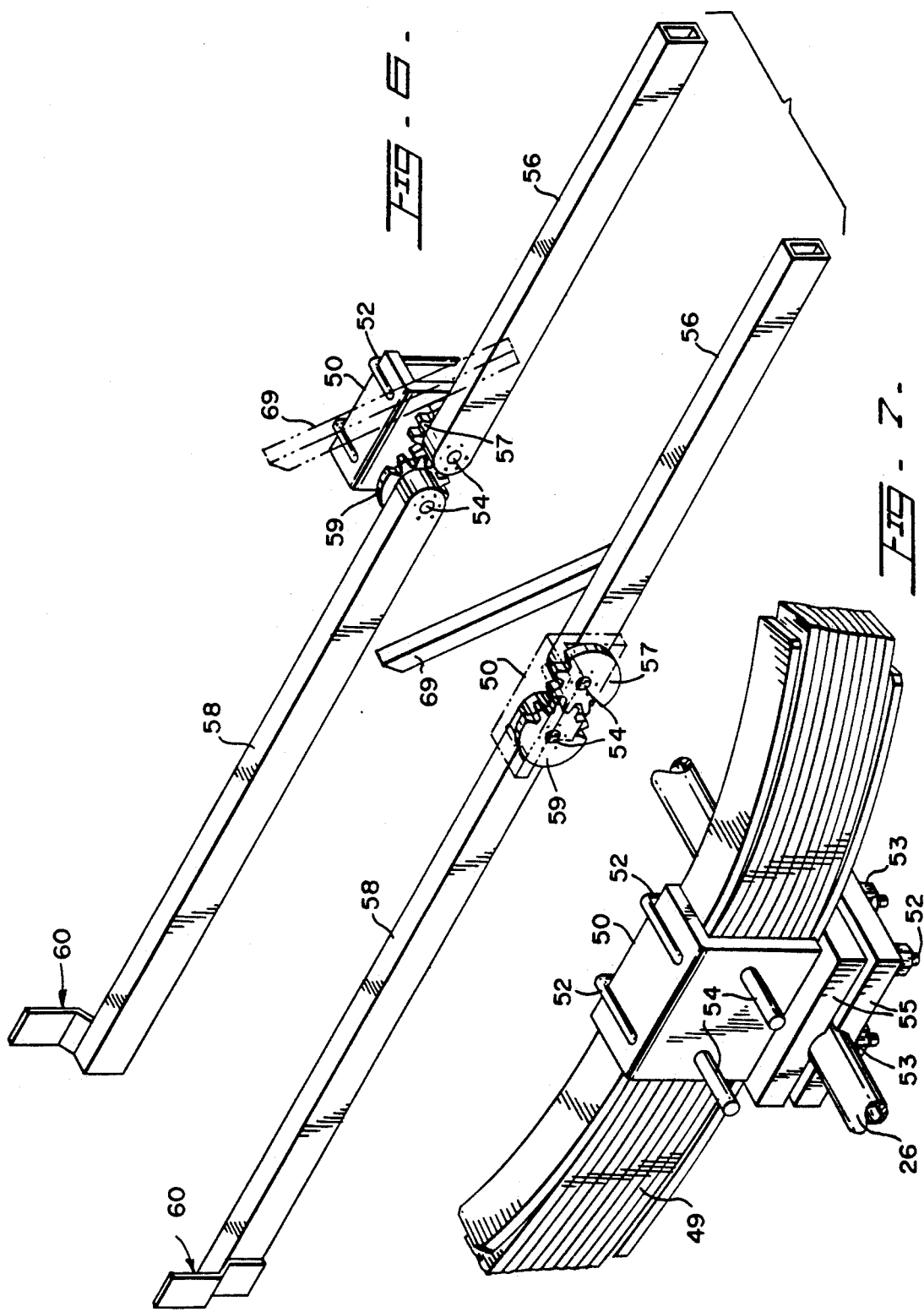

TOWING APPARATUS AND THRUST REVERSAL MECHANISM THEREFOR

BACKGROUND OF THE INVENTION

1. Field of the Invention

This invention relates to apparatus for towing vehicles, such as wrecked automobiles and trucks, and other heavy loads that require towing. More particularly, this invention is directed to towing apparatus of the type that is mounted on a towing vehicle provided with means for elevating and supporting one end of the towed vehicle while the opposite end of the towed vehicle is supported by wheels rotating along the ground. This invention incorporates a thrust reversal system that enables the towing apparatus of this invention to be safer and more efficient than prior art apparatus.

2. Prior Art Problems and Proposed Solutions

It is desirable to operate towing vehicles capable of loading and unloading towed loads as rapidly and efficiently as possible while consuming a minimum amount of fuel for each tow load. Therefore, a need existed for greater use of light weight towing vehicles having less complicated structure than existed in the prior art.

In most instances, a hoisting apparatus is usually mounted on such vehicles to lift and support a vehicle being towed. Such hoisting apparatus included a lifting device that extends rearward beyond the rear end of the chassis of the towing vehicle.

Frequently, the towed load is so heavy that it causes a substantial counter balancing of the weight of the towing vehicle forwardly of its rear wheels. This counterbalancing force tends to lift the front wheels of the towing vehicle about an axis defined by its rear wheels. This front wheel lifting tendency makes it difficult to steer the towing vehicle and also makes it hazardous to drive said vehicle.

When a relatively light weight towing vehicle is coupled to a relatively heavy towed load, the traction forces between the front wheels mounted on a front wheel axle and the rear wheels, mounted as a pair on a rear axle or mounted in tandem on a pair of rear axles of the towing vehicle, become distributed in a rearward direction of the coupled bodies. The heavy weight load being towed tends to pivot the towing vehicle about its rear axis interconnecting its rear wheels, thereby lifting its front wheels off a road to cause the problems previously discussed.

The danger resulting from the tendency to lift the towing vehicle in the vicinity of its front wheels is increased when the coupled bodies are accelerated in the forward direction. Therefore, towing vehicles have been provided with sufficient initial weight at their front ends to counteract the forces that tend to lift the front end wheels of the towing vehicle. Previous arrangements to obtain this added rear axle pressure have required complicated devices housed in specially built vehicles and have increased the fuel consumption of the towing vehicles whenever they were moved, either with or without a load in tow.

It has been suggested to transmit the kinetic and potential energies of the towed load to the front of the towing vehicles by means of tension springs and articulated lever arrangements which convert horizontal tensile forces into vertical pressure forces. These suggested arrangements cannot be utilized properly unless further complicated mechanical contrivances such as semi-rigid mechanisms are included. These contrivances complicate the construction of the devices to control the kinetic and potential energies to such an extent that they are impractical because they are expensive to build and require frequent repair and considerable maintenance.

The following proposals to reduce the tendency of a heavy load to create a moment of force about a rear axis of a towing vehicle to lift its front wheels have been followed with results that require further improvement.

1. Increase the weight in the vicinity of the front axle of the towing vehicle. A drawback to this proposal is that it requires the towing vehicle to be so heavy that permanent increase of its fuel consumption results.

2. Make the wheel base of the towing vehicle as long as practicable. However, an excessive length of the towing vehicle impairs the ability of a driver to control the maneuverability of the towing vehicle.

3. Keep the overhang of the recovery crane hook extending rearwardly from the rear suspension or rear axle of the towing vehicle to a minimum. Such an arrangement complicated loading and unloading of a vehicle to be towed because it limits the access space between the towing vehicle and the towed vehicle.

4. Provide a towing vehicle with means for moving one or more longitudinally moving masses that are mounted for longitudinal movement along the length of the towing vehicle to vary the front axle loading of the vehicle in response to the different moments of force that are applied to a towing vehicle about a transverse axis of pivoting defined by the rear axis of the towing vehicle in response to different weights of the towed load. This latter suggestion requires permanently adding considerable mass to the towing vehicle. The added mass deleteriously affects the efficient operation of the towing vehicle because its great weight requires increased fuel consumption at all times.

The incorporation of any of the aforesaid proposed features or any combination of one or more of them has led to uneconomical and costly designs in prior attempts to provide an acceptable tow performance.

2. Prior Art Patents and Their Limitations

U.S. Pat. No. 2,111,341 to TETRAULT, issued Mar. 15, 1938, shows a towing vehicle 10 having a chassis 11 supporting a pivotable boom 20 on an auxiliary frame 19. Boom 20 pivots about a pivot shaft 23. The ends of shaft 23 extend through slots 46 formed in webs of side channels of the auxiliary frame 19. Rollers 48 and 49 are journaled on each end of shaft 23. Thus, pivotable boom 20 pivots downward to receive the front end of a load such as wheels of an automobile to be towed and shaft 23 moves forward along slots 46 of the towing vehicle as the boom 20 pivots to lift the front end of the towed vehicle. However, even in its forwardmost position, pivot shaft 23 is to the rear of the rear wheel 12 of the towing vehicle so that the load of the towed vehicle always causes a moment of force in a direction that tends to lift the front wheels of the towing vehicle thereby leaving unresolved the problems described hereinbefore.

U.S. Pat. No. 2,747,890 to GERHARDT et al., issued May 29, 1956, shows a coupling device for producing additional ground pressure of both coupled vehicles. Three modifications of coupling devices are shown to couple railroad cars, the wheels of which are constantly on a common set of tracks. In this patent, the lifting arrangement commonly used in a towing apparatus for lifting and towing a wrecked vehicle is not a problem that this patented invention faces.

U.S. Pat. No. 3,687,315 to DONALDSON, issued Aug. 29, 1972, shows a coupling between a towing truck 1 that supports a pivotable crane 10 that pivots about a transverse axis 14 substantially aligned in a vertical plane with the rear wheels 5 and 6 of the towing vehicle and connected to a towed vehicle 19 by a series of elements such as a pulley wheel, a suspension cable 17, a hook 18 at the end of the suspension cable 17, a compression member 20 and an adjustable chain link assembly 28 attaching compression member 20 to the front and rear of a casualty vehicle and actuating a hydraulic ram 21 to apply a tension in a wire rope assembly 25. This arrangement induces a compressive force in compression member 20. The attachment points of hydraulic ram 21 and compression member 20 on the rear end 13 of the towing vehicle and a cross member 22 of the chassis frame constitute a couple acting in opposition to the moment produced by loading a jig 11 with casualty vehicle 19 to the rear of the rear wheels 5 and 6 of the towing vehicle. The inclusion of an adjustable chain link assembly 28 between the towing vehicle 1 and the towed load 19 reduces the control for turning the assembly of towing vehicle and towed vehicle.

U.S. Pat. No. 4,265,463 to PERRUSO, issued May 5, 1981, shows a combination vehicle for towing, dumping and the like. An important feature of this device is a vertical boom 50 located to the rear of the pivot axis formed by the rear wheels 16 of the towing vehicle. Under these circumstances, the moment of force about the pivot axis along the rear wheel axle of the towing vehicle always acts in a direction that tends to lift the front end of the towing vehicle. The moment of force applied by the towed vehicle 48 is always applied in a downward direction to the rear of the rear axle of rear wheel 16 of the towing vehicle in this patent.

U.S. Pat. No. 4,318,657 to ZNIDARIC, issued Mar. 9, 1982, shows a loading and transporting vehicle to tow heavy objects. In this patent, a loading bridge 1 is mounted directly on the under carriage 2 of the towing vehicle. The loading bridge 1 pivots relative to under carriage 2 about a transverse axis 11 that is located slightly forward of a rear axle 13 about which its rear wheels 29 rotate. The major portion of the towed vehicle is usually supported to the rear of the rear axle 13 so that the effect of the moment of force due to the towed vehicle about rear wheel axle 13 of the towing vehicle is always in the direction that tends to lift the front wheel axle of the towing vehicle of this patent.

U.S. Pat. No. 4,664,585 to AMBRIDGE et al., issued May 12, 1987, mounts a pair of longitudinal tracks 16 on a bed 19 of a chassis 2 of a towing vehicle 1 and provides hydraulic rams 17 for slidably mounting a pair of masses 15 on the chassis 2 for longitudinal movements along tracks 16 to compensate for the reduced front axle loading that occurs when a towed vehicle carried by a lower section 13 extending rearward of a lifting beam 8 increases the moment of force applied behind pivot 9 of the towing vehicle which tends to lift front wheel axis 4 of the truck. The incorporation of heavy masses 15 needed to move the center of gravity of the system forward of the rear wheel axis makes it difficult to control steering of the towing vehicle and requires a large amount of fuel to operate, so that it is not fuel efficient.

U.S. Pat. No. 4,761,110 to BOUTILIER, issued Aug. 2, 1988, discloses a vehicle lifting and towing apparatus attached to an intermediate portion 12 of a rear bumper of a towing vehicle 10. Intermediate bumper portion 12 of the rear bumper is pivotally attached to a lifting frame 16. The latter is pivotally attached to a main frame 22 about a main pivot shaft 24 and also is provided with hydraulic actuators 48 that move a sub frame 42 of the lifting frame 16 in a direction longitudinally of the main frame 22 of vehicle 10. A spring 68 is mounted on a bracket 66 on each side of the vehicle between lifting frame 16 and a rear axle 70 for towing vehicle 10 to protect lifting frame 16 from excessive jarring. In this patent, lifting frame 16 is directly attached to main frame 22 of the towing device both forward and rearward of the rear wheel axle 70. Lifting frame 16 can be stored beneath main frame 22 when the vehicle is not used for towing.

A common drawback in all of the aforesaid prior art references is a direct attachment between an auxiliary frame that supports a lifting mechanism and the main frame of the towing vehicle behind or to the rear of a transverse axle which supports rear wheels about which the towing vehicle would tend to rotate. Hence, when the towing vehicle tows an excessive load, the prior art only provides heavy mass at or near the front end of the towing vehicle, which increases fuel consumption while counteracting front end lifting. Alternative prior art solutions require complicated connecting means between the towing vehicle and the towed vehicle. Such apparatus requires frequent repair and maintenance that are both expensive and time consuming.

BRIEF DESCRIPTION OF THE INVENTION

The invention provides novel apparatus for towing or lifting and supporting a heavy load to the rear of a towing vehicle in such a manner that the towing vehicle does not lift its front end in an upward direction relative to a transverse axis of pivoting, defined by either a single transverse rear wheel axle or by one of a plurality of rear wheel axles mounted in tandem, when a towed vehicle is loaded onto a loading frame to the rear of the towing vehicle. According to this invention, downward force applied by a load to the rear of the pivot axis that causes an upward moment of force onto the front end portion of the towing vehicle in prior art towing apparatus is applied to a thrust reversal system that reverses the thrust applied to the front portion of the towing vehicle from an upward thrust that lifts the front portion of prior art towing vehicles to a downward thrust that increases the downward force of the front portion of the towing vehicle. The thrust reversal system used with towing apparatus in the manner of this invention is of relatively simple rugged construction that requires less frequent repair and maintenance then prior art connection systems.

A preferred embodiment of thrust reversal system used in the towing apparatus of this invention comprises a front lever member having a forward end portion fixed to the main frame of the towing vehicle in front of the rear wheel axle. Said forward end portion is the only portion of the thrust reversal system that is attached to the main frame of the towing vehicle. The thrust reversal system also comprises a rear lever member fixed to a lifting frame that trails the towing vehicle. A downward force of the towed vehicle or any load stored on the lifting frame acts to the rear of the rear wheel axle of the towing vehicle. Intermeshing gears are fixed to the forward end of the rear lever member and the back end of the front lever member. The intermeshing gears are rotatably mounted on a pair of pivot rods carried by a common bracket. The latter rests on either a portion of the main frame or on a leaf spring mounted on the main frame of the towing vehicle, but is not directly connected to main frame 12.

The meshing gears cause a reversal of thrust so that a downward force applied by a suspended vehicle on the lifting frame develops a downward moment of force at the forward end of the front lever member where it is attached to the main frame of the towing vehicle. This resulting downward moment of force increases the force applied through both the front and rear wheels of the towing vehicle to the pavement on which the towing vehicle is operated. This arrangement provides an improvement over the operation of prior art towing and lifting devices where at least some of the attachment of the lifting frame to the main frame of the towing vehicle takes place only to the rear of the rear wheel axle of the towing vehicle, which causes the load of the towed vehicle to lift the front end of the towing vehicle about an axis defined by the rear wheels of the towing vehicle.

The consequential benefits of this invention resulting from the relatively simple construction of the thrust reversal system compared to the more complicated prior art structures will become obvious in the light of a study of a description of a preferred embodiment and various modifications thereof which follows.

BRIEF DESCRIPTION OF THE DRAWINGS

In the drawings that form part of a description of a preferred embodiment,

FIG. 1 is a partially exploded perspective view of towing apparatus of this invention showing a towing vehicle and an attached lifting frame for supporting wheels at one end of a towed load, and a conventional wrecker body shown in an exploded view in phantom.

FIG. 2 is a horizontal sectional view of the frame of the towing apparatus of FIG. 1 taken below the wrecker body and with the rear part of the lifting frame omitted.

FIG. 3 is a longitudinal vertical sectional view along the line 3—3 of FIG. 2.

FIG. 4 is a rear elevation of the towing apparatus of FIG. 1 with the rear part of the lifting apparatus omitted for simplicity.

FIG. 5 is a perspective view similar to FIG. 1, omitting certain parts such as the leaf spring, and exploding the left rear wheel of the towing vehicle to show details of the thrust reversal system.

FIG. 6 is an enlarged partial perspective view of a preferred embodiment of a thrust reversal system having pair of brackets, each rotatably supporting a pair of intermeshing gears, with one of a pair of oblique members in phantom.

FIG. 7 is an enlarged view of an L-shaped support bracket that supports a pair of stub shafts on which the intermeshing gears of one of the thrust reversal mechanisms of the thrust reversal system of FIG. 6 are supported for pivoting in simultaneously opposite rotations.

DESCRIPTION OF PREFERRED EMBODIMENT

The drawings depict a towing apparatus comprising a towing truck or towing vehicle 10 having a pair of longitudinal truck frame members 12 and a cab 16. A conventional wrecker body and boom equipment 18 (shown in phantom) is separated to illustrate the elements of the present invention in greater detail and clarity.

The towing vehicle 10 comprises a front wheel assembly 20 (FIG. 3) mounted on a front axle assembly 22 and one or more rear wheel assemblies 24 mounted on rear axle assembly 26. A single rear wheel assembly is shown mounted on a single rear axle assembly 26, but it is also envisioned that a pair of rear axle assemblies may be mounted in tandem or one behind the other, each provided with a rear wheel assembly 24 thereon.

A conventional wheel lifting device 30 is shown extending to the rear of the towing vehicle 10. The manner in which the conventional wheel lifting device is connected to the towing vehicle comprises a novel feature of the present invention. The wheel lifting device 30 comprises a main piston housing 31 containing a main piston 32 movable longitudinally within main piston housing 31. Main piston 32 is extended to move the lifting device 30 rearward in spaced relation behind the towing vehicle 10 and retracted in the forward direction to bring the lifting device 30 closer to the rear of the towing vehicle 10.

Lifting device 30 also comprises a bracket 33 pivotally mounted to the rear end of the main piston 32. A transverse member 34 extends laterally outwardly from pivoted bracket 33 in each opposite direction therefrom. A rectangular sleeve 35 fits over each transverse member 34 to adjust the length of each transverse member 34. A tunnel-like housing 36 is provided at the lateral outer end of each rectangular sleeve 35 to form a longitudinal tunnel therethrough.

An L-shaped member 37 extends into an inturned finger 38 at the rear extremity a longitudinal leg 39 that extends through each housing 36 so as to position the inturned fingers 38 relative to the position of transverse members 34 to provide supports for a pair of tires supported on lifting member 30. Straps may be provided to secure the mounting of front wheels (not shown) of a vehicle to be towed while the front wheels are resting on the L-shaped members 37 of lifting device 30.

A piston support housing 40 extends laterally from each side wall of main piston housing 31 to support a lower end of each of a pair of oblique pistons 42. The latter extend obliquely upward within a pair of oblique piston housings 41 into an upper portion from which pivot pins 43 extend laterally. Several apertured walls 44 extend downward from a rear cross member 45 for each pair of pins 43 extending from oblique piston housings 41. Pins 43 are rotatably received in apertures of apertured walls 44.

Cross member 45 forms the rear member of an open roof structure that comprises a horizontal connection member 46 that extends from rear cross member 45 to a front cross member 47. Several apertured vertical members 48 extend in pairs downward from front cross member 47. A pair of transversely spaced, longitudinal structural members 29 curved convexly in elevation are attached at their rear ends to the forward portion of horizontal piston housing 31 and at their forward ends are pivoted to each pair of apertures of apertured vertical members 48. A pair of oblique members 69 are welded to the bottom of front cross member 47 and a corresponding rear lever arm 56 for structural reinforcement.

A pair of leaf springs 49 are fixed at their ends to longitudinal truck frame members 12 forward and rearward of the location of the single rear axle assembly 26 or one of the rear axle assemblies 26 if the rear axle assemblies are constructed in tandem. A pair of J-shaped hangers 51 interconnects each end of each spring with a longitudinal track frame member 12 on either side of the frame of towing vehicle 10. L-shaped brackets 50 rest in floating relation over the central portion of each leaf spring 49 at each side of the rear axle assembly. U-bolts 52 are provided to cooperate with L-shaped brackets 50 to enable the combination to rest on the center of each leaf spring 49 in alignment over the housing for each rear axle assembly 26, or in case of where two rear axle assemblies are provided in tandem, the rear axle of the tandem assembly. As an alternative, U-bolts 52 may be constructed and arranged to slip fit in front of the front rear axle assembly and to the rear of the rear of the second rear axle assembly to the rear of the tandem arrangement.

Front and rear support rods 54 (FIGS. 6 and 7) extend inward from each of the L-shaped brackets 50. Plates 55 are provided to maintain the longitudinal position of U-bolts 52 when lock nuts 53 are threaded thereon to hold the plates 55 at the lower end of Unbolts 52 under the appropriate rear axle assembly or assemblies 26.

The apparatus for connecting the lifting mechanism 30 to the towing vehicle 10 comprises a rear lever arm 56 having a first thrust reversing member, such as gear 57, at its front end and a front lever arm 58 having a second thrust reversing member, such as gear 59, at its rear end at each side of the main frame of towing vehicle 10. Gears 57 and 59 are constructed and arranged to intermesh.

Strap means 60 (see FIGS. 2 and 3) extend vertically to connect the front end of each front lever arm 58 to a corresponding longitudinal truck frame member 12. The points of connection between the truck frame members 12 and the front ends of front lever arms 58 is forward of the axis of pivoting defined by the pair of rear wheels 24 mounted on rear wheel axle 26 or the rear wheels mounted on the rear axles of the tandem arrangement of rear axles in case the towing vehicle has a pair of rear axles. A lower portion 62 of strap means 60 is fixed to the front end of front lever arm 58 and an upper portion 64 of strap means 60 is fixed to a corresponding longitudinal frame member 12. Strap means 60 connect the front end portions of front lever arms 58 to frame members 12 forward of a pivot axis corresponding to rear wheels 26. A guide 65 slidably holds the rear end of rear lever arm 56 against a convenient part of wheel lifting device 30, preferably at a location to the rear of rear wheels 26.

From the description just completed, it will be understood that any downward thrust provided by a load mounted on wheel lifting device 30 would cause each rear lever arm 56 to pivot in such a direction that its attached gear 57 will tend to rotate about one of the support rods 54 extending transversely from L-shaped bracket 50. When gear 57 develops a moment of force in one rotary direction about its associated support rod 54, its meshing with gear 59 causes a moment of force in the opposite rotary direction about its associated support rod 54.

Support rods 54 are mounted in pairs along each L-shaped bracket 50 and are constructed and arranged relative to one another so that when the front ends of rear lever arms 56 are pivoted to the rear support rods 54 extending transversely from brackets 50, the front support rods 54 extending transversely from the corresponding L-shaped bracket are constructed and arranged so that gears 59 at the rear ends of front end lever arms 58 intermesh with corresponding gears 57.

Therefore, a load on lifting device 30 that causes gears 57 at the front ends of rear lever arms 56 to tend to rotate in one direction simultaneously causes gears 59 at the rear ends of front lever arms 58 to tend to rotate in the opposite direction simultaneously.

These counter rotations cause the front lever arms 58 to pivot in such a way that their front ends acting through strap means 60 provide a downward thrust instead of an upward thrust to frame members 12 between the rear wheel axle 26 above the pivot line for rear wheels 24 and front axle assembly 22 rather than the normal provision of an upward thrust on the front portion of the towing truck 10 that tends to pivot the front end of the towing truck upward relative to the pivot axis defined by the aligned rear wheels 24 mounted to the rear wheel axle 26 of the towing vehicle 10. Therefore, gears 57 and 59 perform as cooperating thrust reversal members.

The apparatus just described provides a simple device for interconnecting a lifting device supporting a towed vehicle with its forward wheels lifted and its rear wheels in rolling engagement with a road along which a towing vehicle 10 is driven. Thus, the present apparatus enables the downward thrust provided by any load mounted on the lifting device 30 to increase rather than decrease the downward thrust applied to frame members 12 forward of the rear axle assembly 26 about which the portion of the truck including its front axle assembly 22 would tend to rotate. Therefore, this invention causes the front wheels of the towing truck to remain in direct engagement with the road on which the tandem arrangement of the towing vehicle and its towed load are driven without requiring either heavy weights on the towing truck 10 that decrease its fuel efficiency or complicated structure to reverse the thrust that the towed load applies to the towing truck frame forward of the transverse axis common to the rear wheel assembly 24.

While the embodiment illustrated and described shows front lever arms 58 and rear lever arms 56 and gears 57 and 59 having an equal number of teeth and equal diameters, it is understood that the mechanical advantage of the thrust reversal system can be modified by having the lengths of rear lever arms 56 different from those of front lever arms 58 and/or the number of gears and/or the diameter of gears 57 different from the number of gears and/or the diameter of gears 59. It is preferred that the arrangement of lever arms 56 and 58, gears 57 and 59 and support rods 54 extending laterally inward from L-shaped bracket 50 to one side of the longitudinal center line of the frame formed by truck frame members 12 be the mirror image of the corresponding structural members on the other side of said longitudinal center line so that the simultaneous opposite rotations of interengaging gears 57 and 59 does not cause the frame of towing vehicle 10 to warp. Lever arms 56 and 58, gears 57 and 59, rods 54 and L-shaped brackets 50 are preferably made of strengthened steel to avoid distortion of the elements of the thrust reversal system.

Furthermore, while L-shaped brackets 50 are shown supported in such a manner that a central point between its rods 54 is vertically aligned over rear axle assembly 26 of a single rear wheel axle towing vehicle, it is also envisioned that said central point be vertically aligned over a rear axle 26 of a plural rear axis assembly whose axles are arranged in tandem. It is also acceptable to align said central point between rods 54 of each L- shaped bracket with any transverse line defined by a plurality of rear axle assemblies arranged in tandem.

It is also understood that while the presently preferred embodiment comprises a thrust reversal system comprising a pair of thrust reversal components mounted in mirror image relation to one another along the opposite sides of the towing vehicle frame, the thrust reversal components need not be constructed and arranged as mirror images of one another. Furthermore, the present invention contemplates that its thrust reversal system need contain only one thrust reversal component associated with a towing vehicle frame without departing from the gist of this invention.

Conforming to the provisions of the patent statutes, applicant has provided an explanation of the principle, preferred construction and mode of operation of this invention and has illustrated and described what is now considered to be its best embodiment. It is understood, however, that within the scope of the claimed subject matter that follows, the invention may be practiced otherwise than as specifically illustrated and described.

What is claimed is:

1. A towing apparatus for lifting and towing a heavy load, comprising a towing vehicle having a vehicle body, a main frame for said vehicle body comprising a plurality of longitudinally extending main frame elements, a front wheel axle supported by a forward portion of said main frame, at least one rear wheel axle supported by a rear portion of said main frame, a lifting frame extending rearward of said main frame and supported for longitudinal movement relative to said main frame and for pivotal movement in a vertical direction about a transverse axis relative to said main frame, a thrust reversal system comprising at least one bracket, said bracket supporting a front pivot rod and a rear pivot rod, a front lever member having front and rear end portions and pivoted at its rear end portion to said front pivot rod, and a rear lever member having front and rear end portions and pivoted at its front end portion to said rear pivot rod, said front lever member having a front end portion fixed to said main frame forward of said rear wheel axle and a front thrust reversal member fixed to said rear end portion of said front lever member for pivoting about said front pivot rod, said rear end portion of said rear lever member attached to said lifting frame and said front end portion of said rear lever member provided with a rear thrust reversal member fixed to said front end portion of said rear lever member for pivoting about said rear pivot rod, said thrust reversal members being constructed and arranged to cooperate with one another so that when a load supported on said lifting frame pivots said lifting frame downward, said rear thrust reversal member attached to the front end portion of said rear lever member tends to rotate in one direction about said rear pivot road and to mesh with said front thrust reversal member attached to the rear end portion of said front lever member so that said front thrust reversal member tends to rotate in a direction opposite said one direction about said front pivot rod and causes the front end portion of said front lever member to apply a downward moment of force to said main frame sufficiently forward of said rear wheel axle to overcome a tendency of a moment of force that would be applied by said load to lift the front wheel axle of said towing vehicle in the absence of said cooperating thrust reversal members.

2. A towing vehicle as in claim 1, wherein said thrust reversing members comprise intermeshing gears fixed to the front end portion of said rear lever member and to the rear end portion of said front lever member for simultaneous rotation of said intermeshing gears in opposite directions about said pivot rods.

3. A towing vehicle as in claim 1, wherein said connection of said front end portion of each said front lever member to said main frame forward of said rear wheel axle is the only direct connection of said lever members to said main frame.

4. A towing vehicle as in claim 1, wherein said bracket rests on said main frame in floating relation thereto.

5. A towing vehicle as in claim 1, wherein said lifting frame is pivotally supported relative to said main frame and said thrust reversal system comprises a first pair of thrust reversal members mounted to rest on said main frame in transversely spaced relation from the longitudinal center line of said main frame to extend longitudinally of said main frame along said main frame and a second pair of thrust reversal members mounted to an opposite side of the longitudinal center line thereof in mirror image relation to said first pair of thrust reversal members.

6. A towing vehicle as in claim 5, further including a pair of leaf springs, each of said leaf springs supported at its ends on said main frame and one of said pivot rod supporting brackets rests on one of said leaf springs in unattached relation thereto in substantial alignment with said rear wheel axle.

7. A towing vehicle as in claim 6, wherein said rear wheel axle is one of a pair of rear wheel axles mounted in tandem along the longitudinally extending main frame elements, and wherein said supporting brackets rest over said main frame in unattached relation thereto in the general vicinity above the position occupied by said rear wheel axles.

8. A towing vehicle as in claim 1, further including a leaf spring supported in alignment over each end portion of said rear wheel axle and means for resting said pivot rod supporting bracket over said leaf spring in substantial alignment with said rear wheel axle.

9. A towing vehicle as in claim 8, wherein said leaf spring is one of two leaf springs, one of said two leaf springs being supported over said rear wheel axle a short distance inward of a rear wheel mounted near one end of said rear axle, the other of said two leaf springs being supported over said rear wheel axle a short distance inward of a rear wheel mounted near the other end of said rear axle and another pivot rod supporting bracket resting on the other of said two leaf springs supported over said rear wheel axle a short distance inward of a rear wheel mounted near the other end of said rear axle.

10. A towing vehicle as in claim 1, wherein said front end portion of said front lever member is connected to said main frame intermediate said rear wheel axle and said front wheel axle.

11. A towing vehicle as in claim 1, wherein said rear wheel axle is one of a pair of rear wheel axles arranged in tandem and said pivot rod support bracket rests in vertical alignment with said tandem arrangement of said rear wheel axles.

12. A towing vehicle as in claim 11, wherein said pivot rod support bracket rests in vertical alignment over the transverse center line of said tandem arrangement.

13. A towing vehicle as in claim 11, wherein said pivot rod support bracket rests in vertical alignment over the rearmost rear axle of said tandem arrangement.

* * * * *